US008181843B1

United States Patent
Enzaka et al.

(10) Patent No.: US 8,181,843 B1
(45) Date of Patent: May 22, 2012

(54) FRICTION STIR WELDING METHOD AND ITS DEVICE

(75) Inventors: Masao Enzaka, Kita-ku (JP); Hiroyuki Hakaridani, Kita-ku (JP); Soichiro Yamamoto, Kita-ku (JP)

(73) Assignee: Calsonic Kansei Corporation, Saitama-ken (JP)

( * ) Notice: Subject to any disclaimer, the term of this patent is extended or adjusted under 35 U.S.C. 154(b) by 0 days.

(21) Appl. No.: 13/280,576

(22) Filed: Oct. 25, 2011

(30) Foreign Application Priority Data

Nov. 16, 2010 (JP) .................................. 2010-255486

(51) Int. Cl.
*B23K 20/12* (2006.01)

(52) U.S. Cl. ............... 228/112.1; 228/113; 228/114; 228/2.1; 409/64; 409/66; 409/70

(58) Field of Classification Search ............... 228/112.1, 228/113, 114, 2.1; 409/64, 66, 70
See application file for complete search history.

(56) References Cited

U.S. PATENT DOCUMENTS

2004/0046003 A1* 3/2004 Vyas ........................ 228/112.1

FOREIGN PATENT DOCUMENTS

JP 4215179 1/2009

* cited by examiner

*Primary Examiner* — Kiley Stoner
*Assistant Examiner* — Erin Saad
(74) *Attorney, Agent, or Firm* — Wenderoth, Lind & Ponack, L.L.P.

(57) ABSTRACT

In a friction stir welding method, a tool is moved being rotated along portions to be joined of a work piece, where the portions include a corner with a smaller curvature that connect two portions with larger curvatures. The method includes the steps of setting the work piece on a supporting member, rotating the tool around a center axis thereof, moving the tool toward the work piece to penetrate a portion of the tool into the work piece at the portions to be joined, and moving and turning the tool along the portions to be joined. A rotation speed of the tool around the center axis thereof is decreased to be smaller at the corner with the smaller curvature than the rotation speed of the tool around the center axis thereof at the portions with the larger curvatures.

4 Claims, 5 Drawing Sheets

FRICTION STIR WELDING METHOD AND ITS DEVICE

BACKGROUND OF THE INVENTION

1. Field of the Invention

The present invention relates to a friction stir welding method and its welding device in which jointing portions to be jointed of metal work piece are stirred to be flown in a plastic state due to friction heat generated by stirring and then the metal structure of the jointing portions is cooled down to be unified.

2. Description of the Related Art

Friction stir welding is a solid-state joining process without using fusion or filler materials, thereby the original metal characteristics being maintained to be unchanged as far as possible.

A conventional friction stir welding method of this kind is disclosed in Japanese Patent N0. 4215179. This prior friction stir welding method has a tool with a small pin or nib, a drive electric motor that rotates the tool, an air cylinder that presses the tool on jointing portions of a work piece, and slide mechanisms that moves the tool on a horizontal surface (X-axial direction and Y-axial direction) and in a vertical direction (Z-axial direction). The tool has a shoulder portion, which is larger in radiator than the pin. The shoulder and the pin are pressed on the jointing portions, being rotated, so as to be inserted into them, and the tool is moved along the jointing portions in a state where a center axis of the tool is slanted along the moving direction so that the pin side is positioned forward.

However, in the above known conventional friction stir welding method, there is a problem in that the joining temperature in the jointing portions might reach the melting points of the metals and/or the durability of the pin deteriorates due to the friction stir welding that is carried out at the jointing portions in a case where the straight sections are contacted with each other through a square corner or through a small round corner.

The reason is as follows.

Normally the tool and pin are rotated at a constant speed and they are moved along a weld line (the portions to be jointed) of work piece at a constant speed, where the rotating pin penetrates the portions to be jointed to the depth slightly less than the weld depth required and the rotating tool shoulder is in contact with the portions to be joined. This mechanical mixing process generates heat, which causes the stirred material to soften without reaching its melting point.

When the above-mentioned friction stir welding method is applied to a work piece which has straight sections connected with each other through a tight corner such as a square corner or a small round corner, the tool with pin is needed to change its moving direction at the corner. In this case, the tool with pin is rotated on the corner at a high total speed consisting of a rotating speed of the tool with pin and a direction changing speed thereof. Consequently, the heat generated on the corner rises to have a temperature higher than that generated at the straight sections of the work piece. This higher heat might cause the metal characteristics of the jointed portions to be changed due to the temperature higher than the melting point of the work piece, and/or it might deteriorate the durability of the pin.

It is, therefore, a first object of the present invention to provide a friction stir welding method which overcomes the foregoing drawbacks and can weld portions to be joined of a work piece as fast as possible, avoiding the temperature of the portions to be jointed of the work piece from reaching the melting point of the work piece at a tight corner such as a square corner and a small round corner during friction stir welding.

It is a second object of the present invention to provide a friction stir welding device which overcomes the foregoing drawbacks and can weld portions to be joined of a work piece as fast as possible, avoiding the temperature of the portions to be jointed of the work piece from reaching the melting point of the work piece at a tight corner such as a square corner and a small round corner during friction stir welding.

SUMMARY OF THE INVENTION

According to a first aspect of the present invention there is provided a friction stir welding method in which a tool is moved being rotated along portions to be joined of a work piece, where the portions includes a corner with a smaller curvature that connect two portions with larger curvatures. The method comprising the steps of: setting the work piece on a supporting member, rotating the tool around a center axis of the tool, moving the tool toward the work piece to penetrate a portion of the tool into the work piece at the portions to be joined, and moving and turning the tool along the portions to be joined. A rotation speed of the tool around the center axis of the tool is decreased to be smaller at the corner with the smaller curvature than the rotation speed of the tool around the center axis of the tool at the portions with the larger curvatures.

Therefore, the method of the present invention can weld the portions to be joined of the work piece as fast as possible, avoiding the temperature of the portions to be jointed of the work piece from reaching the melting point of the work piece at the corner with smaller curvature, namely the tight corner, during friction stir welding.

According to a second aspect of the present invention there is provided a friction stir welding device for welding portions to be jointed of a work piece having a corner with a smaller curvature that connect two portions with larger curvatures. The device includes a supporting member that supports the work piece, a horizontally moving mechanism capable of moving the work piece on a horizontal surface, a vertically moving mechanism capable of vertically moving tool so as to penetrate in and depart from the portions to be joined, a direction changing mechanism capable of changing an advance angle direction of the tool whose center axis is inclined relative to an upper surface of the portions to be joined, a rotating mechanism capable of rotating the tool around the center axis of the tool, and a controller capable of controlling the horizontally moving mechanism, the vertically moving mechanism, the direction changing mechanism, and the rotating mechanism in such a way that a rotation speed of the tool around the center axis of the tool is decreased to be smaller at the corner with the smaller curvature than the rotation speed of the tool around the center axis of the tool at the portions with the larger curvatures.

Therefore, the device of the present invention can weld the portions to be joined of the work piece as fast as possible, avoiding the temperature of the portions to be jointed of the work piece from reaching the melting point of the work piece at the corner with smaller curvature, namely the tight corner, during friction stir welding.

Preferably, the corner with the smaller curvature is one of a round corner and a square corner. The welding stir method and its device of the present invention are suitable to the work pieces having such corners.

Preferably, the tool has a tool main body having a cylindrical body shape, a pin that is provided on an end portion of the tool main body, and a shoulder surface provided on the end portion of the tool main body, and a travel direction of the tool is changed by a center axis of the tool being turned around a center point of the shoulder surface.

Therefore, welding zone can be pretended from departing the portions to be joined.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
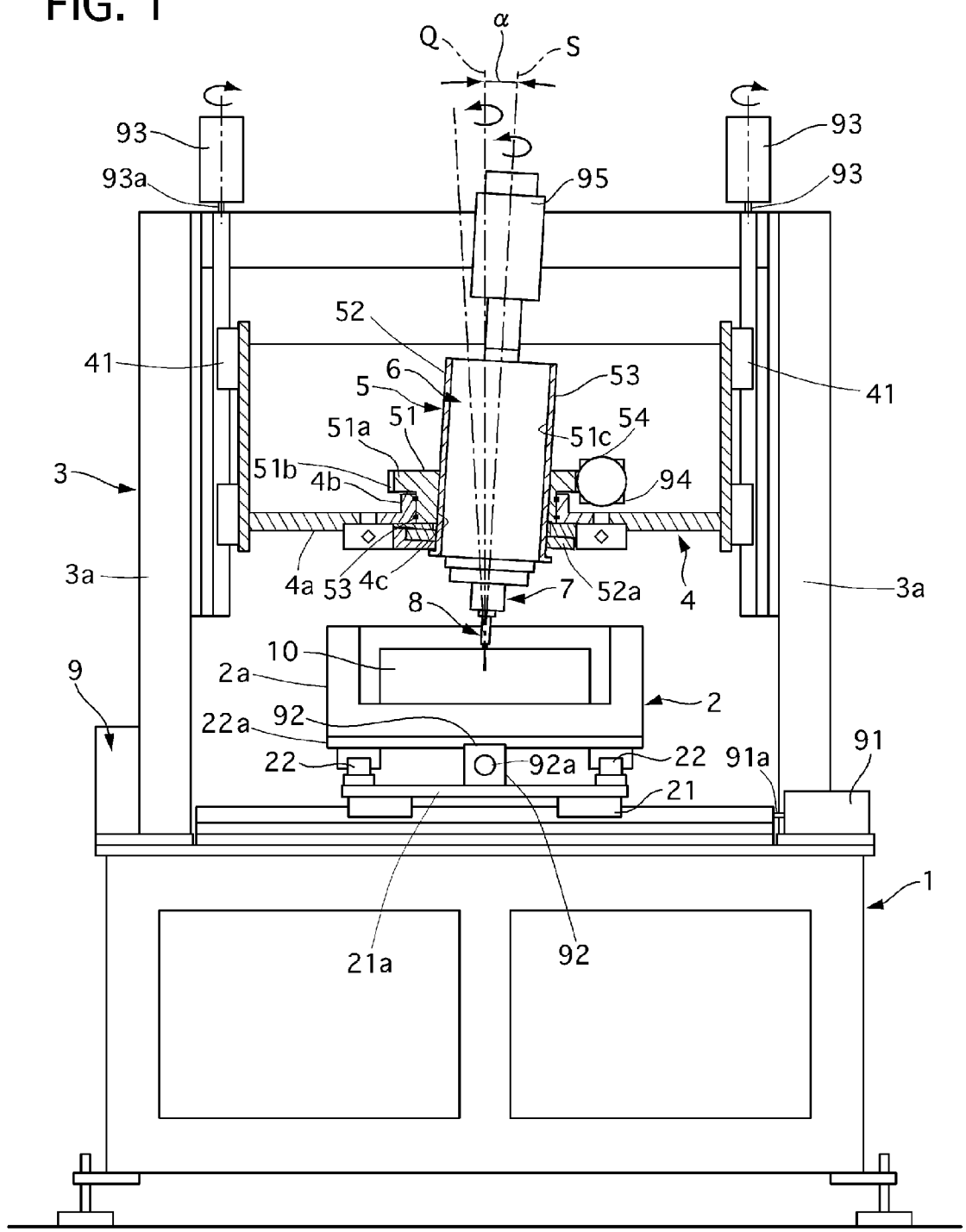
FIG. 1 is a front view showing a friction stir welding device that performs a friction stir welding method of a first embodiment according to the present invention.

Throughout the following detailed description, similar reference characters and numbers refer to similar elements in all figures of the drawings, and the descriptions thereof are omitted for eliminating duplication.

Referring to FIG. 1 of the drawing, there is shown a friction stir welding device that can perform a friction stir welding method of a first preferred embodiment of the present invention.

The friction stir welding device of the first embodiment is equipped with a base 1, a horizontally slidable table 2, a main frame 3, a vertically slidable frame 4, a rotatable cylinder 5, a spindle 7 with a tool chuck 7a, a tool 8, and a controller 9.

The base 1 is a strong metal frame having like a rectangular shape, and it is firmly placed on a floor to support the main parts of the friction stir welding device thereon.

The horizontally slidable table 2 is placed on the base 1 to fix a work piece 10 thereon, and it includes an X-axial directional slide mechanism 21 and a Y-axial directional slide mechanism 22 so that the slide mechanisms 21 and 22 can move the work piece 10 relative to the base 1 on a horizontal surface. The X-axial directional slide mechanism 21 and the Y-axial directional slide mechanism 22 correspond to a horizontally moving mechanism of the present invention.

Incidentally, the X-axial direction is a left and right direction in FIG. 1, while the Y-axial direction is a front and rear direction perpendicular to the X-axis in FIG. 1.

The X-axis directional movement of the horizontally slidable table 2 is executed by an X-axis servo motor 91, which is provided at the outer side of the right portion of the main frame 3 and on the right portion of the base 1 to move a first carrier plate 21a in the X-axial direction. Similarly, the Y-axis directional movement of the horizontally slidable table 2 is executed by a Y-axis servo motor 92, which is provided on the center front portion of the carrier plate 21a of the X-axis directional slide mechanism 21 to move the second carrier plate 22a in the Y-axis direction. A cramping table 2a is fixed on the second carrier plate 22a to cramp the work piece 10 thereon. The servo motors 91 and 92 rotate screw shafts 91a, 92a so that engaging portion provided under the first carrier plate 21a and the second carrier plate 22a so that the carrier plates 21a and 22a can move on the horizontal X-axial and Y-axial lines parallel to the screw shafts 91a, 92a, respectively.

Incidentally, the X-axial directional slide mechanism 21 is arranged over the Y-axial directional slide mechanism 22 in the first embodiment, while the former may be arranged under the latter. The cramping table 22a corresponds to a supporting member of the present invention.

The main frame 3 is shaped like a gate, having a plurality of pillars 3a, for example four pillars, and the lower portions of the pillars are firmly fixed on the upper surface portions of the base 1. The main frame 3 supports the vertically slidable frame 4, the rotatable cylindrical holder 5, the tool supporting cylinder 6, the spindle 7, the tool 8, servo motors 93 to 95 and others.

The vertically slidable frame 4 includes a vertically slide mechanism 41, a supporting plate member 4a, and a plurality of Z-axis servo motors 93. The vertically slidable frame 4 is supported on the pillars 3a through the vertically slide mechanism 41 in such a way that the tool 8 is slidable in a vertical direction (Z-axial direction) along the pillars 3a. The Z-axis servo motors 93 are provided on upper frame members of the main frame 3 near the pillows 3a to rotate screw shafts 93a so as to move engaging portions of the supporting plate member 4a in the vertical direction. The vertically slidable frame 4 corresponds to a vertically moving mechanism of the present invention.

The supporting frame member 4a is formed to have a rectangular shape which is provided with a cylindrical portion 4b to receive the rotatable cylinder 5 through bearings 53 arranged between the inner cylindrical surface of the cylindrical portion 4b and the outer circumferential portion of a rotatable cylindrical holder 51 of the rotatable cylinder 5. The cylindrical portion 4b has a through-hole 4c whose center axis Q is perpendicular to the base 1 and the horizontally slidable table 2.

The rotatable cylinder 5 includes the rotatable cylindrical holder 51 and a cylinder 52. The rotatable cylindrical holder 51 is provided at its upper end portion with an enlarged disc portion 51a with gear teeth 51b on the outer circumferential portion thereof. The gear teeth 51b are engaged with a worm 54 that is driven by a θ-axis servo motor 94 so that the rotatable cylindrical holder 51 can rotate around the center axis Q relative to the supporting frame member 4a. The θ-axis servo motor 94 is fixed on the supporting frame member 4a. The diameter of the enlarged disc portion 51b is larger than that of the through-hole 4c, so that the rotatable cylindrical holder 51 is inserted into the through-hole 4c from upper side thereof. The rotatable cylindrical holder 51 is provided with a through-hole 51c whose center axis S is inclined at the angle α to the center line Q of the through-hole 4c of the cylindrical portion 4b of the supporting frame member 4a. The angle α is set to correspond to an advance angle of the tool 8.

The cylinder 52 is provided with a flange portion 52a at its lower end portion, and the cylinder 52 is inserted into the through-hole 51c from a lower side thereof. The flange portion 52a is rotatably supported under the supporting frame member 4a, being sandwiched by a tapered seat member 4d and a lower tapered holding member 4e. The cylinder 52 can be detached from the supporting frame member 4a and the rotatable cylindrical holder 51 by removing the lower tapered holding member 4e and pulling the cylinder 52 downward.

Incidentally, the rotatable cylindrical holder 51 may be provided with the through-hole 51c having the angle α different from that of the first embodiment. In this case, the rotatable cylindrical holders 51 may be replaced from that of the first embodiment to another one.

The rotatable cylinder 5 corresponds to a direction changing mechanism of the present invention.

The tool supporting cylinder 6 is received in the slanted cylinder 52 to rotatably support the spindle 7, which penetrates through the tool supporting cylinder 6.

The top portion of the spindle 7 is connected with an S-axis servo motor 95, and the lower end portion thereof is provided with the chuck 7 that can cramp the tool 8.

Figure 2:
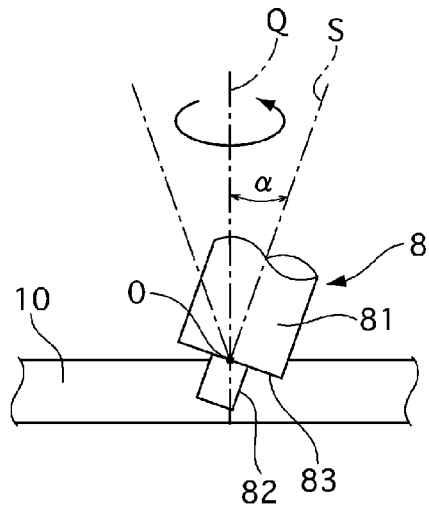
FIG. 2 is an exploded view showing a state where main parts, namely a pin and a tool shoulder, of the friction stir welding device shown in FIG. 1 are inserted into members to be jointed.

The tool 8 has a tool main body 81 shaped like a cylinder object and it is provided on the lower end portion of the tool main body 81 with a pin (probe or nib) 82 that is smaller in diameter than the tool main body 81 as shown in FIG. 2. The cylindrical side surface of the tool main body 81 and the pin 82 are continuously connected by a shoulder surface 83 of the tool 8.

FIG. 2 shows the tool 8 moving in a direction indicated by an arrow G to weld the work piece 10. In this state, the length of the pin 82 is set to be slightly less than the weld depth required and the pin 82 penetrates the work piece 10, being rotated. At the same time, a lower portion of the shoulder surface 83 of the inclined tool main body 81 is pressed on the top surface of the work piece 10 to rub the upper portion thereof.

The vertical center axis Q passes through the center point O of the shoulder surface 83, where the center point O is appropriately on the top surface of the work piece 10. On the other hand, the spindle 7 and the tool 8 can be rotated around their center axis S by the S-axis servo motor 95, they can be rotated around the center point O by the rotatable cylinder 5 that is driven by the θ-axis servo motor 94 through the gear teeth 51b and the worm 54. The latter rotation movement is a gyro motion of the center axis S around the center point O and the center axis Q.

Figure 3:
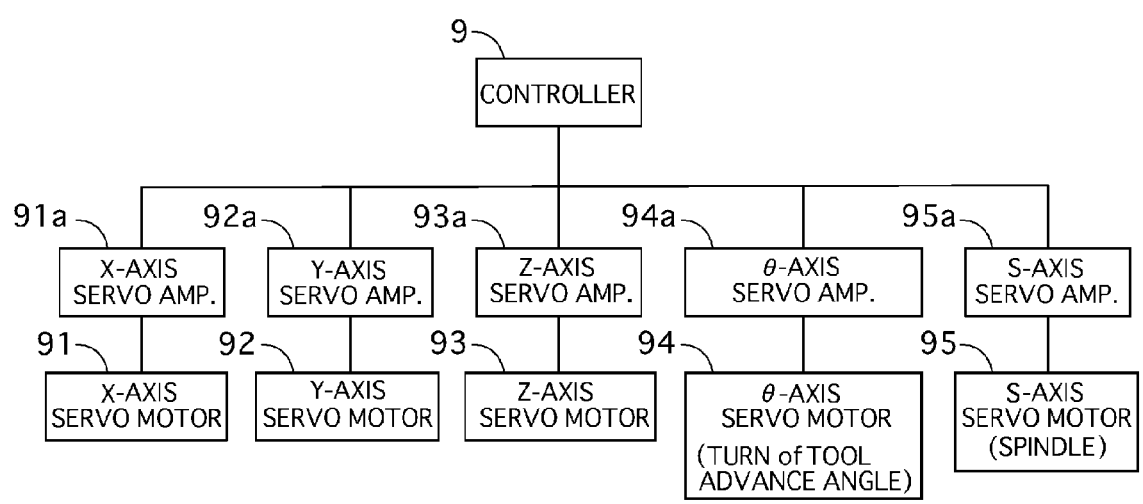
FIG. 3 is a block diagram showing a controller that is used in the friction stir welding device shown in FIG. 1 and its control system.

The controller 9 is placed at the outer side of the left portion of the main frame 3 in FIG. 1 and on the right portion of the base 1. The controller 9 is electrically connected to not-shown sensors, not-shown switches, the servo motors 91 to 95, and so on. As shown in FIG. 3, the controller 9 is equipped with an X-axis servo amplifier 91a, a Y-axis servo amplifier 92a, a Z-axis servo amplifier 93a, a θ-axis servo amplifier 94a and an S-axis servo amplifier 95a, which drive and control the X-axis servo motor 91, the Y-axis servo motor 92, the Z-axis servo motor 93, the θ-axis servo motor 94 and the S-axis servo motor 95, respectively. The controller 9 controls the servo amplifiers 92a to 95a to output controlled electric power to the servo motors 92 to 95, respectively. The drive rotation speed of the S-axis servo motor 95 is largely higher than those of the other servo motors 92 to 94.

The X-axis servo motor 91, the Y-axis servo motor 92, the X-axis servo amplifier 91a, and the Y-axis servo amplifier 92a correspond to the horizontally moving mechanism of the present invention. The Z-axis servo motor 93, and the Z-axis servo motor 93 correspond to the vertically moving mechanism of the present invention. The θ-axis servo amplifier 94a and the θ-axis servo motor 94 correspond to the direction changing mechanism of the present invention. The S-axis servo amplifier 95a and the S-axis servo motor 95 correspond to the rotating mechanism of the present invention.

Next, the friction stir welding control carried out by the controller 9 will be explained.

Figure 4:
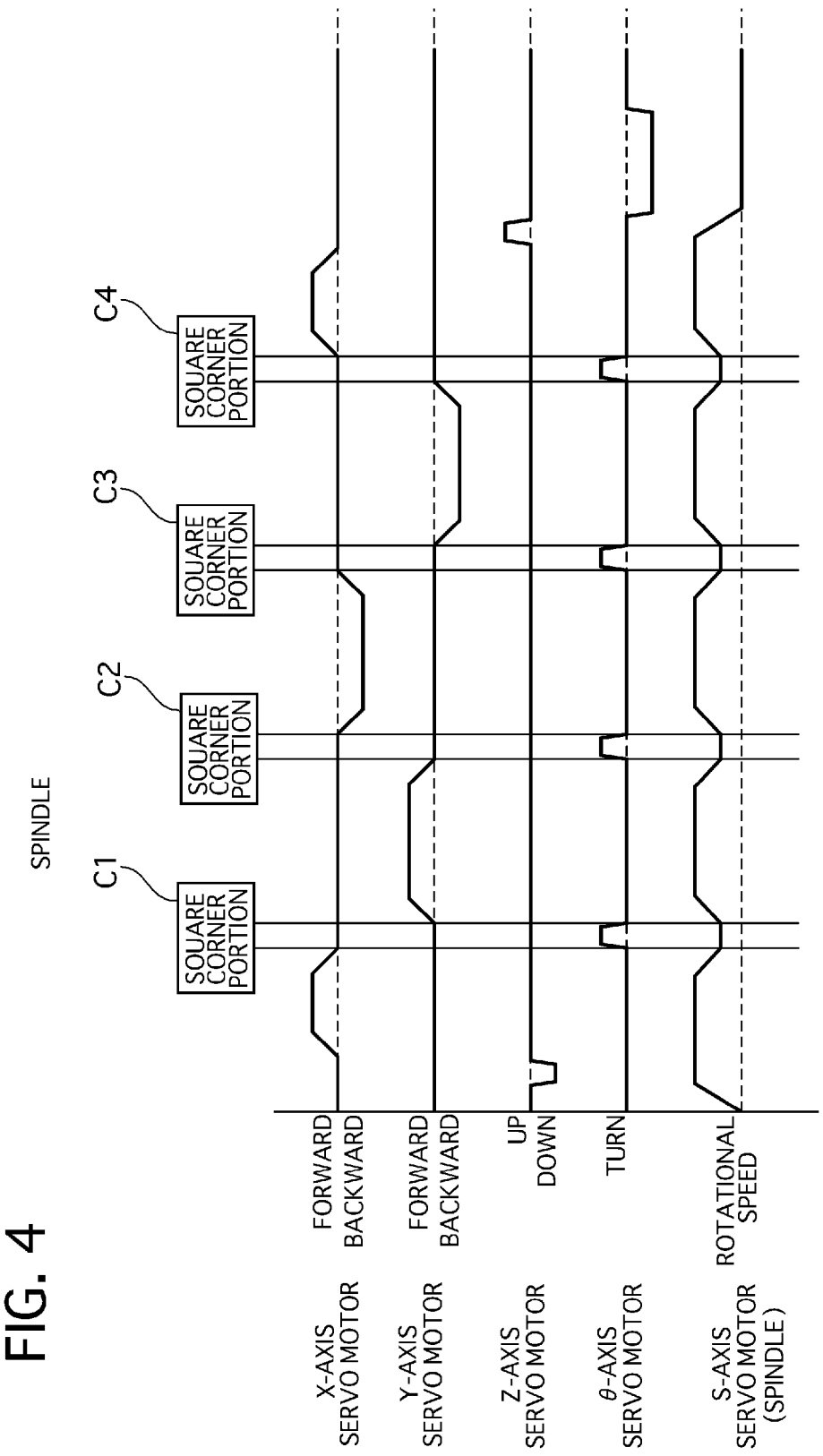
FIG. 4 is a time chart showing control contents that are carried out by the controller of the friction stir welding device shown in FIG. 1.
Figure 5:
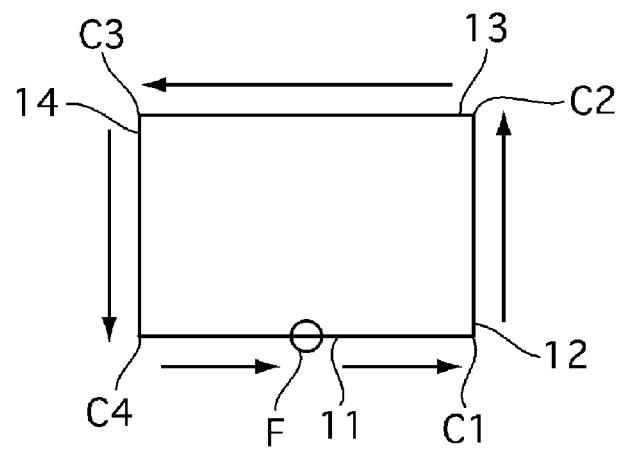
FIG. 5 is a view showing a shape of portions to be joined of a work piece, to which the friction stir welding method of the first embodiment is applied.

The controller 9 executes servo-motor control according to a time chart shown in FIG. 4 when the portions to be jointed of the work piece 10 are formed in a rectangle shape consisting of a first straight line portion 11, a second straight line portion 12 perpendicular to the first straight line portion 11, a third straight line portion 13 parallel to the first straight line portion 11, a fourth straight line portion 14 parallel to the second straight line portion 12, and first to fourth square corners C1 to C4 that connect the adjacent straight line portions 11 to 14, respectively, as shown in FIG. 5.

In this embodiment, a start point and an end point of the movement of the tool 8 are the same point indicated by F in FIG. 5, and the tool 8 is moved according to the arrows shown in FIG. 5, being turned at the first to fourth square corners C1 to C4.

At first, the work piece 10 having the above-described portions be joined is placed and clamped on the cramping table 2a.

The controller 9 starts to drive the X-axis servo motor 91 and the Y-axis servo motor 92 to move the cramping table 2a on which the work piece 10 is cramped so that the tool 8 can be positioned at the start point F when the tool 8 is moved down. This X-axial and Y-axial positioning control is not shown in the time chart shown in FIG. 4.

Then, as shown in FIG. 4, the controller 9 starts to drive the S-axis servo motor 93, and when its rotation speed becomes stable at a predetermined high rotation speed, the controller 9 starts the Z-axis servo motors 93 to drive the vertically slide mechanism 41, so that the vertically slidable frame 4 moves down toward the work piece 10.

Consequently, the tool 8 is moved down and pressed on the work piece 10 at the start point F in such a way that the pin 82 and a portion of the shoulder surface 83 of the tool main body 81 are inserted into the portions to be joined of the work piece 10. After the pin 82 and the portion of the shoulder surface 83 penetrates to a predetermined depth at the start point F, the controller 9 stops the Z-axis servo motors 93. Incidentally, the advance angle direction of the tool 8 has been set to be a right direction on the first straight line portion 11 in FIG. 5 by using the θ-axis servo motor 94.

Then the controller 9 starts the X-axis servo motor 91 to drive the tool 8, which is rotating around the center axis S at a predetermined constant speed, in the right direction in FIG. 5 along the right half portion of the first straight line portion 11 toward the first square corner C1. As a result, frictional heat is generated primarily between the pin 82 and the material of the work piece 10 and additionally between the shoulder surface 82 and the material of the work piece 10 due to mechanical mixing therebetween. The heat causes the stirred material to soften without reaching the melting point of the material, and the plasticized material flows to deform in the solid state, involving dynamic recrystallization of the base material.

In this process, the rotation speed and the travel speed of the tool 8 is set as fast as possible to facilitate its productivity, within the upper limit where the travel speed and the rotation speed do not cause the temperature of the material of the work piece 10 to reach its melting point and they do not deteriorates the durability of the tool 8.

When the tool 8 reach near the first square corner C1, the controller 9 starts to decrease the rotation speed of the X-axis servo motor 91 down to zero to stop the X-axis directional movement of the tool 8. At the same time, the controller 9 starts to decrease the rotation speed of the S-axis servo motor 95 down to a predetermined lower speed.

In this state, when the tool 8 moves at the first square corner C1, the controller 9 starts to drive the θ-axis servo motor 94 to turn the rotatable cylindrical holder 51 together with the tool 8 90° in a counterclockwise direction in FIG. 5. Incidentally, in the first embodiment, the tool 8 is turned in such a way that the center point O of the shoulder surface 83 moves along the portion to be jointed, namely a welded line expected.

Then, the controller 9 stops the θ-axis servo motor 94 to end the rotation of the rotatable cylindrical holder 51, so that the advance angle direction of the tool 8 is turned upward in FIG. 5 at the first square corner C1.

Although the welding trace at the first square corner C1 is actually not 90°, the plastic flow of the material at the first square corner C1 occurs in a certain area because the pin 82 and the shoulder surface 83 have certain mixing widths. Therefore, the portions at the first square corner C1 are surely welded and joined.

When the tool 8 is turned to the second square corner C2 at the first square corner C1, the rotation speed of the S-axis servo motor 95 is increased up to the predetermined high speed as the Y-axis servo motor 92 starts to drive the tool 8 so that the tool 8 can move along the second straight line portion 12. Then the tool 8 moves near the second square corner C2 at the predetermined constant speed, rotating at the predetermined high rotation speed, along the second straight line portion 12 to stir the material thereof.

When the tool 8 reach near the second square corner C2, the controller 9 starts to decrease the rotation speed of the Y-axis servo motor 92 down to zero to stop the Y-axis directional movement of the tool 8. At the same time, the controller 9 starts to decrease the rotation speed of the S-axis servo motor 95 down to the predetermined lower speed.

In this state, when the tool 8 moves at the second square corner C2, the controller 9 starts to drive the θ-axis servo motor 94 to turn the rotatable cylindrical holder 51 together with the tool 8 90° in the counterclockwise direction in FIG. 5. Accordingly, the tool 8 is turned in such a way that the center point O of the shoulder surface 83 moves along the portion to be jointed.

Then, the controller 9 stops the θ-axis servo motor 94, so that the advance angle direction of the tool 8 is turned in the left direction in FIG. 5 at the second square corner C2. The rotation speed of the S-axis servo motor 95 is returned to the predetermined high rotation speed, and the X-axis servo motor 91 starts to rotate in the rotational direction opposite to the rotational direction (backward direction) at the first straight line portion 11 so that the tool 8 moves along the third straight line portion 13 toward the third square corner C3 at the predetermined constant speed, rotating at the predetermined high speed to stir the material thereof.

When the tool 8 reach near the third square corner C3, the rotation speed (the absolute value) of the X-axis servo motor 91 is decreased to zero and the rotation speed of the S-axis servo motor 95 is also decreased to the predetermined lower speed. The θ-axis servo motor 94 starts to drive to turn the rotatable cylinder holder 51 90° in the counterclockwise direction, that is, to the fourth square corner C4 at the third square corner C3.

The controller 9 stops the θ-axis servo motor 94, so that the advance angle direction of the tool 8 is turned in the downward direction in FIG. 5 at the third square corner C3. The rotation speed of the S-axis servo motor 95 is returned to the predetermined high rotation speed, and the Y-axis servo motor 92 starts to rotate in the rotational direction opposite to the rotational direction at the second straight line portion 12 so that the tool 8 moves along the fourth straight line portion 13 toward the fourth square corner C4 at the predetermined constant speed, rotating at the predetermined high speed to stir the material thereof.

When the tool 8 reach near the fourth square corner C4, the rotation speed (the absolute value) of the Y-axis servo motor 92 is decreased to zero and the rotation speed of the S-axis servo motor 95 is also decreased to the predetermined lower speed. The θ-axis servo motor 94 starts to drive to turn the rotatable cylinder holder 51 90° in the counterclockwise direction, that is, to the first square corner C1 at the fourth square corner C4.

The controller 9 stops the θ-axis servo motor 94, so that the advance angle direction of the tool 8 is turned in the right direction in FIG. 5 at the fourth square corner C4. The rotation speed of the S-axis servo motor 95 is returned to the predetermined high rotation speed, and the X-axis servo motor 91 starts to rotate in the same direction as that at the first straight line portion 11 so that the tool 8 moves along the first straight line portion 11 toward the first square corner C1 at the predetermined constant speed, rotating at the predetermined high speed to stir the material thereof.

The X-axis servo motor 91 is stopped when the tool 8 reaches the end point F, which corresponds to the start point, and stirs the material thereof. Then the Z-axis servo motor 93 is rotated in the rotational direction opposite to the rotational direction in which the vertically slidable frame 4 is moved downward. This moves the vertically slidable frame 4 with the tool 8 upward to depart from the work piece 10. Then the S-axis servo motor 95 is stopped, so that the rotational movement of the tool 8 around the center axis S thereof also ends. Incidentally, the θ-axis servo motor 94 is then turned in the opposite direction so as to prepare the next welding.

At this time, the jointing portions required of the work piece 10 have been welded, and accordingly the work piece 10 can be brought out of the cramping table 2*a*. This is the end of the friction stir welding of the work piece 10.

As understood from the above-described explanation, the friction stir welding method and the friction stir welding method of the first embodiment has the following advantages.

In the friction stir welding method and the friction stir welding device of the first embodiment, the rotation speed of the tool 8 is decreased at the square corners C1 to C4, being turned to change the travel direction of the tool 8, to be lower than those at the first to fourth straight line portions 11 to 14 of the work piece 10, where the square corners C1 to C4 continuously connect the adjacent straight line portions 11 to 14.

Therefore, the temperature of the material of the jointed portions at the square corners C1 to C4 can be avoided from reaching the melting point, and the tool 8 can be avoided from the deterioration in the durability thereof due to too high temperature thereof, although the tool 8 is moved as fast as possible to accelerate the productivity.

In the first embodiment, the tool 8 is turned at the square corners C1 to C4 in such a way that the center axis S of the tool main body 81 turns around the center point O of the shoulder surface 83 of the tool main body 81 and also around the center axis Q, which is called as the gyro movement.

Therefore, the processing traces formed by the pin 83 and the shoulder surface 83 are prevented from departing from the portions to be joined of the work piece 10 at the square corners C1 to C4. This ensures the tool 8 to easily move along the square corners C1 to C4 to weld the portions of the work piece 10 at the square corners C1 to C4.

In the first embodiment, one, which is driven, of the X-axis servo motor 91 and the Y-axis servo motor 2 is stopped to decrease the travel speed of the tool 8 when the tool 8 moves near the square corners C1 to C4. The rotation speed of the S-axis servo motor 95 starts to be decreased at the same time when the rotation speed of driven one starts to decrease. Then the θ-axis servo motor 94 starts to drive the tool 8 to turn when the tool 8 reaches the square corners C1 to C4.

Therefore, it can remove a lag time between the control time to decrease the travel speed of the tool 8 and the control time to decrease the rotation speed of the tool 8. This can shorten welding time, suppressing the temperature rise in the tool 8 and the portions to be joined at the square corners C1 to C4.

Next, a friction stir welding method of a second embodiment of the present invention will be described.

The friction stir welding method of the second embodiment is carried out by using the friction stir welding device of the first embodiment.

In the second embodiment, the shape of the portion to be joined of a work piece 10 is different from that of the first embodiment. Accordingly, the control of the tool 8 by using the servo motors 91 to 95 is slightly different from that of the first embodiment.

Figure 6:
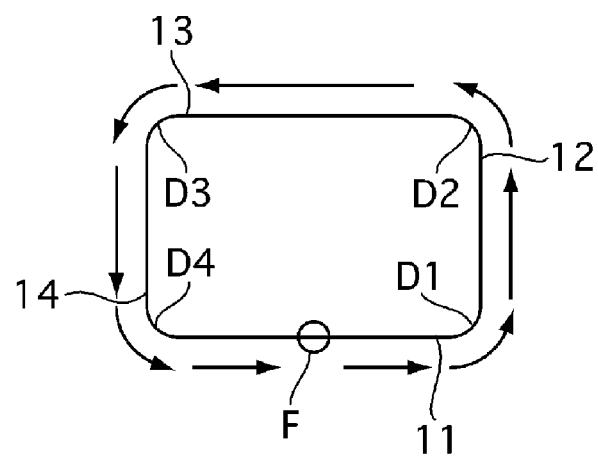
FIG. 6 is a view showing a shape of portions to be joined of a work piece, to which a friction stir welding method of a second embodiment according to the present invention is applied.

FIG. 6 shows the shape of the portion to be joined of the work piece 10 in the second embodiment. The shape thereof is formed like a rectangular shape, which consists of a first straight line portion 11, a second straight line portion 12 perpendicular to the first straight line portion 11, a third straight line portion 13 parallel to the first straight line portion 11, a fourth straight line portion 14 parallel to the second straight line portion 12, and first to fourth small round corners D1 to D4 that connect the adjacent straight line portions 11 to 14, respectively, as shown in FIG. 6.

Figure 7:
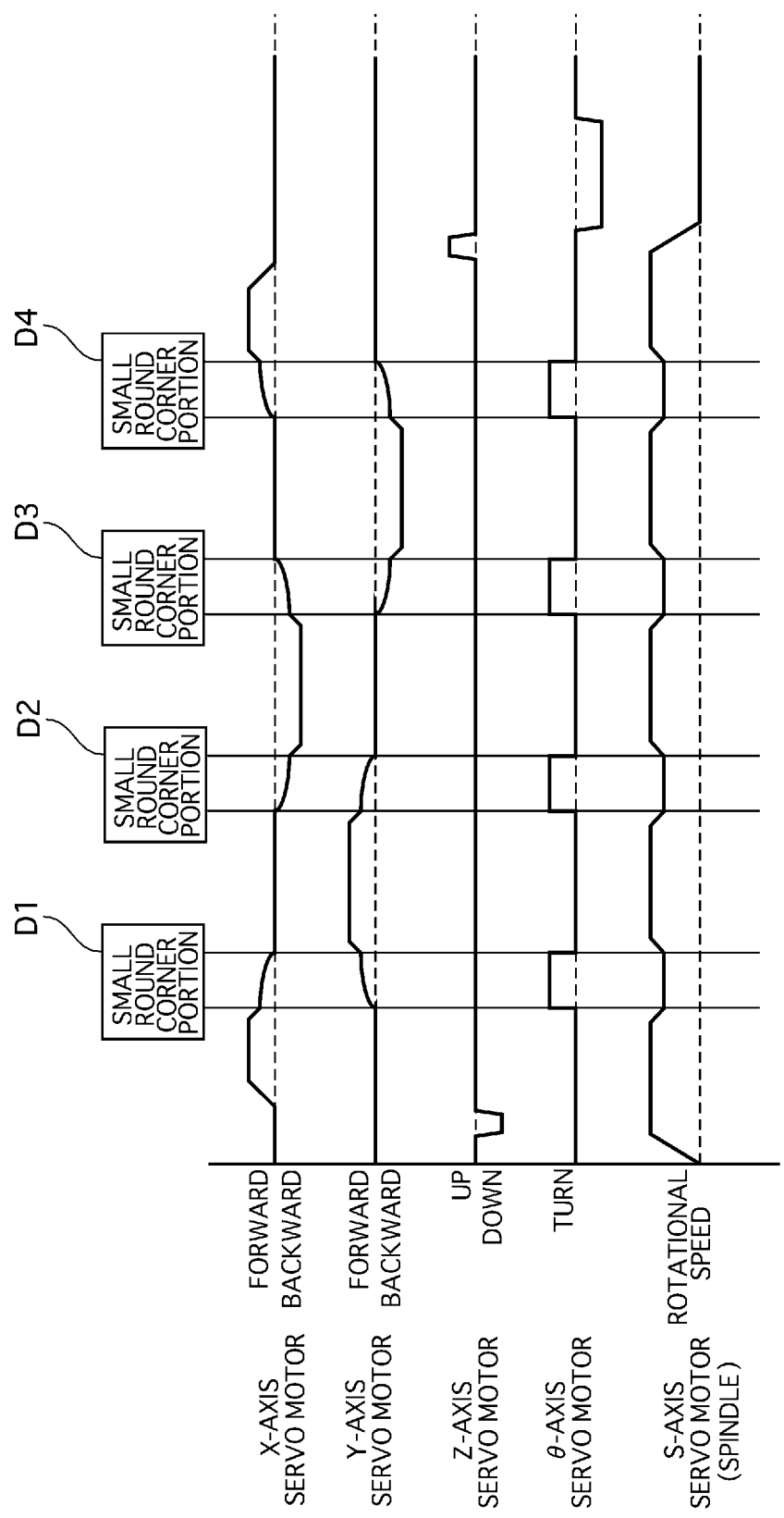
FIG. 7 is a time chart showing control contents that are carried out in the friction stir welding method of the second embodiment.

The controller 9 executes servo-motor control according to a time chart shown in FIG. 7 when the portions to be jointed of the work piece 10 are formed in a rectangle shape consisting of a first straight line portion 11, a second straight line portion 12 perpendicular to the first straight line portion 11, a third straight line portion 13 parallel to the first straight line portion 11, a fourth straight line portion 14 parallel to the second straight line portion 12, and first to fourth small round corners D1 to D4 that connect the adjacent straight line portions 11 to 14, respectively, as shown in FIG. 6.

In this embodiment, a start point and an end point of the movement of the tool 8 are the same point indicated by F in FIG. 6, and the tool 8 is moved according to the arrows shown in FIG. 6, being turned at the first to fourth small round corners D1 to D4.

At first, the work piece 10 having the above-described portions be joined is placed and clamped on the cramping table 2a.

The controller 9 starts to drive the X-axis servo motor 91 and the Y-axis servo motor 92 to move the cramping table 2a on which the work piece 10 is cramped so that the tool 8 can be positioned at the start point F when the tool 8 is moved down. This X-axial and Y-axial positioning control is not shown in the time chart shown in FIG. 7.

Then, as shown in FIG. 7, the controller 9 starts to drive the S-axis servo motor 93, and when its rotation speed becomes stable at a predetermined high rotation speed, the controller 9 starts the Z-axis servo motors 93 to drive the vertically slide mechanism 41, so that the vertically slidable frame 4 moves down toward the work piece 10.

Consequently, the tool 8 is moved down and pressed on the work piece 10 at the start point F in such a way that the pin 82 and a portion of the shoulder surface 83 of the tool main body 81 are inserted into the portions to be joined of the work piece 10. After the pin 82 and the portion of the shoulder surface 83 penetrates to a predetermined depth at the start point F, the controller 9 stops the Z-axis servo motors 93. Incidentally, the advance angle direction of the tool 8 has been set to be a right direction on the first straight line portion 11 in FIG. 6 by using the θ-axis servo motor 94.

Then the controller 9 starts the X-axis servo motor 91 to drive the tool 8, which is rotating around the center axis S at a predetermined constant speed, in the right direction in FIG. 6 along the right half portion of the first straight line portion 11 toward the first small round corner D1. As a result, frictional heat is generated primarily between the pin 82 and the material of the work piece 10 and additionally between the shoulder surface 82 and the material of the work piece 10 due to mechanical mixing therebetween. The heat causes the stirred material to soften without reaching the melting point of the material, and the plasticized material flows to deform in the solid state, involving dynamic recrystallization of the base material.

In this process, the rotation speed and the travel speed of the tool 8 is set as fast as possible to facilitate its productivity, within the upper limit where the travel speed and the rotation speed do not cause the temperature of the material of the work piece 10 to reach its melting point and they do not deteriorates the durability of the tool 8.

When the tool 8 reach near the first small round corner D1, the controller 9 starts to rapidly decrease the rotation speed of the X-axis servo motor 91 to an intermediate level speed, and it gradually decreases the rotation speed from the start portion of the first small round corner D1 to the end portion thereof. The rotation speed of the X-axis servo motor 91 becomes zero at the end portion of the first small round corner D1.

On the other hand, the controller 9 starts to drive the Y-axis servo motor 92 in such a way that the rotation speed of Y-axis servo motor 92 gradually increases up to an intermediate level speed at the end portion of the first small round corner D1.

In addition, the controller 9 drives the θ-axis servo motor 94 at a constant speed at the first small round corner D1.

As a result, the tool 8 moves around along the portion to be joined of the work piece 10 to turn 90° in a counterclockwise direction in FIG. 6.

Further, the controller 9 decreases the rotation speed down to a predetermined lower speed before and near the first small round corner D1, then it maintains the predetermined lower speed at the first small round corner D1. Incidentally, in the second embodiment, the tool 8 is turned in such a way that the center point O of the shoulder surface 83 moves quarter round along the portion to be jointed, namely a welded line expected.

Then, at the end portion of the first small round corner D1, the controller 9 stops the θ-axis servo motor 94 to stop the rotation of the rotatable cylindrical holder 51, so that the advance angle direction of the tool 8 is turned upward in FIG. 6 at the first small round corner D1.

When the tool 8 turned to the second small round corner D2 at the first small round corner D1, the controller 9 rapidly drives the Y-axis servo motor 92 up to the predetermined higher rotation speed and it maintains this speed so that the tool 8 moves upward in FIG. 6 along the second straight line portion 12. At the same time, the controller 9 drives the S-axis servo motor 95 up to the predetermined high rotation speed so as to rotate the tool 8 around the center axis S at high speed.

When the tool 8 reaches near the second small round corner D2, the controller 9 rapidly decreases the rotation speed of the Y-axis servo motor 92 down to the intermediate level speed, then gradually decreasing the rotation speed of the Y-axis servo motor 92 from the start portion of the second small round corner D2 to the end portion thereof.

At the same time, the controller 9 starts to drive the X-axis servo motor 91 in the rotational direction opposite to the rotational direction at the first straight line portion 11 so as to gradually increases the absolute value of its rotation speed up to an intermediate level speed from the start portion of the second small round corner D2 to the end portion thereof.

In addition, the controller 9 drives the θ-axis servo motor 94 at the constant speed while the tool 8 is on the second small round corner D2.

Accordingly, the tool 8 is turned 90° in the counterclockwise direction in FIG. 6 to the third small round corner D3 at the second small round corner D2.

On the other hand, the controller 9 decreases the rotation speed of the S-axis servo motor 95 down to the predetermined lower speed, and then it maintains this speed while the tool 8 is on the second small round corner D2.

When the tool 8 reach the end portion the second small round corner D2, the controller 9 starts to rapidly increase the absolute value of the rotation speed up to the predetermined constant rotation speed, then it maintains its rotation speed.

At the same time, the controller 9 drives the S-axis servo motor 95 to rapidly increase up to the predetermined high constant rotation speed, then maintaining this rotation speed.

Accordingly, the tool 8 moves in the left direction in FIG. 6 along the third straight line portion 13 of the work piece 10.

When the tool 8 reaches near the third small round corner D3, the controller 9 rapidly decreases the absolute value of the rotation speed of the X-axis servo motor 91 down to the intermediate level speed, and it also decreases the S-axis servo motor 95 down to the predetermined lower rotation speed.

Then the controller 9 gradually decreases the rotation speed of the X-axis servo motor 91 down to zero from the start portion of the third small round corner D3 to the end portion thereof. At the same time, the controller 9 starts to drive the X-axis servo motor 92 so that the absolute value of the rotation speed thereof is gradually increased up to the intermediate level speed at the end portion of the third small round corner D3.

The controller 9 drives the θ-axis servo motor 94 at the constant rotation speed from the start portion of the third small round corner D3 to the end portion thereof.

Accordingly, the tool 8 is turned 90° in the counterclockwise direction in FIG. 6 to the fourth small round corner D4 at the third small round corner D3.

Then the controller 9 increases the absolute value of the rotation speed of the Y-axis servo motor 92 up to the higher constant rotation speed, then maintaining this speed, to move the tool 8 downward in FIG. 6 so that the tool 8 travels along the third straight line portion 13 toward the fourth small round corner D4. In this travel movement, the controller 9 rapidly increases the rotation speed f the S-axis servo motor 95 up to the predetermined higher constant rotation speed.

When the tool 8 reaches near the fourth small round corner D4, the controller 9 rapidly decreases the absolute value of the rotation speed of the Y-axis servo motor 92, and it also decreases the rotation speed of the S-axis servo motor 95 down to the predetermined lower rotation speed.

Then the controller 9 starts to gradually increase the rotation speed of the X-axis servo motor 91 up to the intermediate level speed while the tool 8 moves from the start portion of the fourth small round corner D4 to the end portion thereof. The controller 9 gradually decreases the rotation speed from the start portion of the fourth small round corner D4 down to zero at the end portion thereof. In addition, the controller 9 drives the θ-axis servo motor 94 to maintain the constant rotation speed.

As a result, the tool 8 is turned 90° in the counterclockwise direction in FIG. 6 to the first small round corner D1 at the fourth small round corner D4.

On the other hand, the controller 9 decreases and maintains the rotation speed of the S-axis servo motor 95 while the tool 8 travels on the fourth small round corner D4.

Then, the controller 9 rapidly increases the rotation speed of the X-axis servo motor 91 up to the predetermined higher constant rotation speed from the end portion of the fourth small round corner D4, and then it maintains this rotation speed to near the end point F.

Accordingly the tool 8 moves along the first straight line portion 11 to the end point F.

In addition, the S-axis servo motor 95 is rapidly increased up to and maintained at the predetermined constant rotation speed to stir the material of the work piece 10.

At the end point F, the controller 9 stops the X-axis servo motor 91 and then the Z-axis servo motor 93 is rotated in the opposite rotational direction, so that the vertically slidable frame 4 with the tool 8 moves upward to depart from the work piece 10. Then the S-axis servo motor 9 is stopped. At this time, the jointing portions required of the work piece 10 have been welded, and the work piece 10 can be brought out of the cramping table 2*a*. This is the end of the friction stir welding of the work piece 10.

As understood from the above-described explanation, the friction stir welding method and the friction stir welding method of the second embodiment has the following advantages.

In the friction stir welding method and the friction stir welding device of the second embodiment, the rotation speed of the tool 8 is decreased at the small round corners D1 to D4, being turned to change the travel direction of the tool 8, to be lower than those at the first to fourth straight line portions 11 to 14 of the work piece 10, where the small round corners D1 to D4 continuously connect the adjacent straight line portions 11 to 14.

Therefore, the temperature of the material of the jointed portions at the small round corners D1 to D4 can be avoided from reaching the melting point, and the tool 8 can be avoided from the deterioration in the durability thereof due to too high temperature thereof, although the tool 8 is moved as fast as possible to accelerate the productivity.

In the second embodiment, the tool 8 is turned at the small round corners D1 to D4 in such a way that the center axis S of the tool main body 81 turns around the center point O of the shoulder surface 83 of the tool main body 81 and also around the center axis Q, which is called as the gyro movement.

Therefore, the processing traces formed by the pin 83 and the shoulder surface 83 are prevented from departing from the portions to be joined of the work piece 10 at the small round corners D1 to D4. This ensures the tool 8 to easily move along the small round corners D1 to D4 to weld the portions of the work piece 10 at the small round corners D1 to D4.

In the second embodiment, the rotation speed of one, which is driven, of the X-axis servo motor 91 and the Y-axis servo motor 2 and the rotation speed of the S-axis servo motor 95 are decreased at the same time when the tool 8 moves near the small round corners D1 to D4. Therefore, it can remove a lag time between the control time to decrease the travel speed of the tool 8 and the control time to decrease the rotation speed of the tool 8. This can shorten welding time, suppressing the temperature rise in the tool 8 and the portions to be joined at the small round corners D1 to D4.

In addition, the rotation speed of the other thereof is gradually increased, the θ-axis servo motor 94 being driven, while the rotation speed of the driven one is gradually decreased at the first to fourth small round corners D1 to D4. This enables the tool 8 to move square round along the first to fourth small round corners D1 to D4.

While there have been particularly shown and described with reference to preferred embodiments thereof, it will be understood that various modifications may be made therein, and it is intended to cover in the appended claims all such modifications as fall within the true spirit and scope of the invention.

For example, the vertical slidable frame 4, the rotatable cylinder and so on may be replaced to the structures different from that of the first embodiment shown in FIG. 1.

The portions to be joined by using the friction stir welding method of the present invention may be different as long as they have a corner with a smaller curvature that connects two portions with larger curvatures. The corner with the smaller curvature includes the square corners C1 to C4 in the first embodiment and the small round corners D1 to D4 in the second embodiment. The portion with the larger curvature includes a straight line portion because the curvature of the straight line is unlimited.

The entire contents of Japanese Patent Application No. 2010-255486 filed Nov. 16, 2010 are incorporated herein by reference.

What is claimed is:

1. A friction stir welding method in which a tool is moved being rotated along portions to be joined of a work piece, the portions including a corner with a smaller curvature that connect two portions with larger curvatures, the method comprising the steps of:

setting the work piece on a supporting member;
   rotating the tool around a center axis of the tool;
   moving the tool toward the work piece to penetrate a portion of the tool into the work piece at the portions to be joined; and
   moving and turning the tool along the portions to be joined, wherein
   a rotation speed of the tool around the center axis of the tool is decreased to be smaller at the corner with the smaller curvature than the rotation speed of the tool around the center axis of the tool at the portions with the larger curvatures.

2. The friction stir welding method according to claim 1, wherein
   the corner with the smaller curvature is one of a round corner and a square corner.

3. The friction stir welding method according to claim 2, wherein
   the tool has a tool main body having a cylindrical body shape, a pin that is provided on an end portion of the tool main body, and a shoulder surface provided on the end portion of the tool main body, and wherein
   a travel direction of the tool is changed by a center axis of the tool being turned around a center point of the shoulder surface.

4. The friction stir welding method according to claim 1, wherein
   the tool has a tool main body having a cylindrical body shape, a pin that is provided on an end portion of the tool main body, and a shoulder surface provided on the end portion of the tool main body, and wherein
   a travel direction of the tool is changed by a center axis of the tool being turned around a center point of the shoulder surface.

* * * * *